(12) United States Patent
Baker et al.

(10) Patent No.: US 11,914,623 B2
(45) Date of Patent: Feb. 27, 2024

(54) APPROACHES FOR MANAGING ACCESS CONTROL PERMISSIONS

(71) Applicant: Palantir Technologies Inc., Denver, CO (US)

(72) Inventors: James Baker, London (GB); Sander Kromwijk, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 666 days.

(21) Appl. No.: 17/077,792

(22) Filed: Oct. 22, 2020

(65) Prior Publication Data

US 2021/0124766 A1 Apr. 29, 2021

Related U.S. Application Data

(60) Provisional application No. 62/925,714, filed on Oct. 24, 2019.

(51) Int. Cl.
*G06F 16/28* (2019.01)
*G06F 16/22* (2019.01)
(Continued)

(52) U.S. Cl.
CPC .......... *G06F 16/285* (2019.01); *G06F 16/221* (2019.01); *G06F 16/248* (2019.01); *G06F 16/24553* (2019.01); *G06F 21/6227* (2013.01)

(58) Field of Classification Search
CPC ..... H04L 67/535; H04L 63/20; G06F 16/245; G06F 2221/2141; G06F 16/285;
(Continued)

(56) References Cited

U.S. PATENT DOCUMENTS 8,838,597 B1 * 9/2014 Gottumukkala ...... G06F 16/901
707/740
2006/0271390 A1 * 11/2006 Rich ........................ G06F 8/20
717/100
(Continued)

FOREIGN PATENT DOCUMENTS

EP 3422241 A1 1/2019

OTHER PUBLICATIONS

Fan et al., "On-line imputation for missing values," 2017 10th International Congress on Image and Signal Processing, BioMedical Engineering and Informatics (CISP-BMEI) Year: 2017 | Conference Paper | Publisher: IEEE.*
(Continued)

*Primary Examiner* — Roderick Tolentino
(74) *Attorney, Agent, or Firm* — Sheppard Mullin Richter & Hampton LLP

(57) ABSTRACT

Systems and methods are provided for determining a query involving at least one dataset comprising a plurality of records, the query being submitted by a first user operating a computing device. An archetype policy that governs access to records of the at least one dataset can be determined, wherein the archetype policy includes at least one logical formula to be evaluated when determining whether a requesting user is permitted to access a given record, and wherein the at least one logical formula is satisfied based at least in part on a state associated with the requesting user and at least one first variable evaluated by the at least one logical formula. At least one record that the first user is permitted to access can be determined based at least in part on satisfaction of the at least one logical formula associated with the archetype policy.

17 Claims, 9 Drawing Sheets

(51) Int. Cl.
*G06F 16/2455* (2019.01)
*G06F 16/248* (2019.01)
*G06F 21/62* (2013.01)

(58) Field of Classification Search
CPC ............. G06F 16/221; G06F 16/24553; G06F 16/248; G06F 21/6227
See application file for complete search history.

(56) References Cited

U.S. PATENT DOCUMENTS

| | | | |
|---|---|---|---|
| 2015/0134694 A1* | 5/2015 | Burke | G06F 16/245 707/769 |
| 2015/0220659 A1 | 8/2015 | Rissanen et al. | |
| 2017/0024572 A1 | 1/2017 | Ferraiolo et al. | |
| 2018/0052671 A1* | 2/2018 | Venkatesan | G06F 21/10 |
| 2019/0065538 A1* | 2/2019 | Leuchtenburg | G06F 16/258 |
| 2019/0286828 A1* | 9/2019 | Anderson | G06F 21/6263 |
| 2019/0340283 A1* | 11/2019 | Schneider | G06F 16/24542 |
| 2020/0073975 A1* | 3/2020 | Chen | G06F 16/24578 |
| 2020/0089650 A1* | 3/2020 | Sharma | G06N 20/00 |
| 2020/0302040 A1* | 9/2020 | Kaja | G06F 21/54 |

OTHER PUBLICATIONS

Song et al., "The Data Integrity Error Repair Method for Filling Missing Values with External Data," 2019 12th International Congress on Image and Signal Processing, BioMedical Engineering and Informatics (CISP-BMEI) Year: 2019 | Conference Paper | Publisher: IEEE.*

Extended European Search Report for EP Application 20203735.4 dated Mar. 23, 2021, 8 pages.

Ge et al., "A Design for Parameterized Roles", Research Directions in Data and Application Security XVIII, vol. 144, pp. 251-264, Jan. 1, 2004, retrieved from the Internet: URL:https://www.researchgate.net/profile/Sylvia-Osborn/publication/221495316_A_Design_for_Parameterized_Roles/links/55f30d5e08aeld980393e5db/A-Design-for-Parameterized-Roles.pdf.

* cited by examiner

| Timestamp | Employee Id | Expense | Amount | Secure Identifier |
|---|---|---|---|---|
| 2019/07/22 06:30 | James | Coffee | 5.00 | 256 |
| 2019/07/23 15:33 | Eliot | Meal | 8.75 | 456 |
| 2019/07/23 18:55 | Patricia | Meal | 14.50 | 789 |
| 2019/07/24 12:34 | James | Supplies | 26.00 | 012 |
| ⋮ | ⋮ | ⋮ | ⋮ | ⋮ |

APPROACHES FOR MANAGING ACCESS CONTROL PERMISSIONS

CROSS-REFERENCE TO RELATED APPLICATION

This application claims the benefit under 35 U.S.C. 119(e) of U.S. Provisional Application No. 62/925,714, filed Oct. 24, 2019, the content of which is hereby incorporated in its entirety.

FIELD OF THE INVENTION

This disclosure relates to user interfaces and related technologies for managing access to secured data.

BACKGROUND

Under conventional approaches, commissioned data systems provide users with access to various datasets while enforcing access control policies that regulate access to data. Such systems typically allow users to access records, modify records, and query records from tables so long as those users satisfy access control policies associated with the records.

SUMMARY

Various embodiments of the present disclosure can include systems, methods, and non-transitory computer readable media configured to determine a query involving at least one dataset comprising a plurality of records, the query being submitted by a first user operating a computing device. An archetype policy that governs access to records of the at least one dataset can be determined, wherein the archetype policy includes at least one logical formula to be evaluated when determining whether a requesting user is permitted to access a given record, and wherein the at least one logical formula is satisfied based at least in part on a state associated with the requesting user and at least one first variable evaluated by the at least one logical formula. At least one record that the first user is permitted to access can be determined based at least in part on satisfaction of the at least one logical formula associated with the archetype policy.

In an embodiment, corresponding values for the at least one first variable are provided for each record in at least one column of the dataset.

In an embodiment, a state associated with the first user identifies one or more properties associated with the user including at least one of: a user name, a user identifier, and one or more groups associated with the user.

In an embodiment, determining at least one property provided by the state associated with the first user matches the value associated with the at least one record in the at least one column of the dataset includes determining that a user identifier associated with the first user matches a user identifier associated with the record in the at least one column of the dataset.

In an embodiment, determining at least one property provided by the state associated with the first user matches the value associated with the at least one record in the at least one column of the dataset includes determining that a group name associated with the first user matches a group name associated with the record in the at least one column of the dataset.

In an embodiment, the systems, methods, and non-transitory computer readable media are further configured to perform modifying the archetype policy to include a second logical formula that relies on a second variable and modifying the dataset to include a new column that provides values for the second variable.

In an embodiment, the systems, methods, and non-transitory computer readable media are further configured to perform populating the new column with corresponding values for each record of the dataset.

In an embodiment, determining at least one record that the first user is permitted to access based at least in part on satisfaction of the at least one logical formula associated with the archetype policy includes generating a filter for identifying records of the dataset that satisfy the at least one logical formula, wherein the records identified are deemed accessible to the first user.

In an embodiment, the filter is an Structured Query Language (SQL) expression including one or more where clauses to identify records that are accessible to the first user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3A-3D illustrate example diagrams, in accordance with various embodiments.

DETAILED DESCRIPTION

Under conventional approaches, commissioned data systems provide users with access to various datasets while enforcing access control policies that regulate access to data. Such systems typically allow users to access records, modify records, and query records from tables so long as those users satisfy access control policies associated with the tables or with individual records of those tables. For instance, a user may submit a query to a data system to determine an average or median salary from a database table of employee records. In this example, the data system would individually process each record of the database table to determine the average or median salary. As part of this evaluation, the data system will typically determine whether the user has access to the database table. That is, the data system can determine whether the user satisfies one or more access control policies that each regulate access to the database table. In environments where access to data is tightly restricted, each record of the database table may be associated with its own access control policy that must separately be evaluated to determine whether the user has access to that record. For example, each record may be associated with fine-grained access controls to enforce various corporate or legal policies for accessing data. As a result, such conventional approaches can be computationally expensive when user access to data needs to be evaluated individually for many records. For example, a data system that receives a query directed to a database table with one million records will generally need to evaluate each of the one million records one-by-one to determine whether a user submitting the query has access to the record. This additional overhead on the data system can result in significantly slower processing times which can ultimately degrade user experience.

Figure 1A:
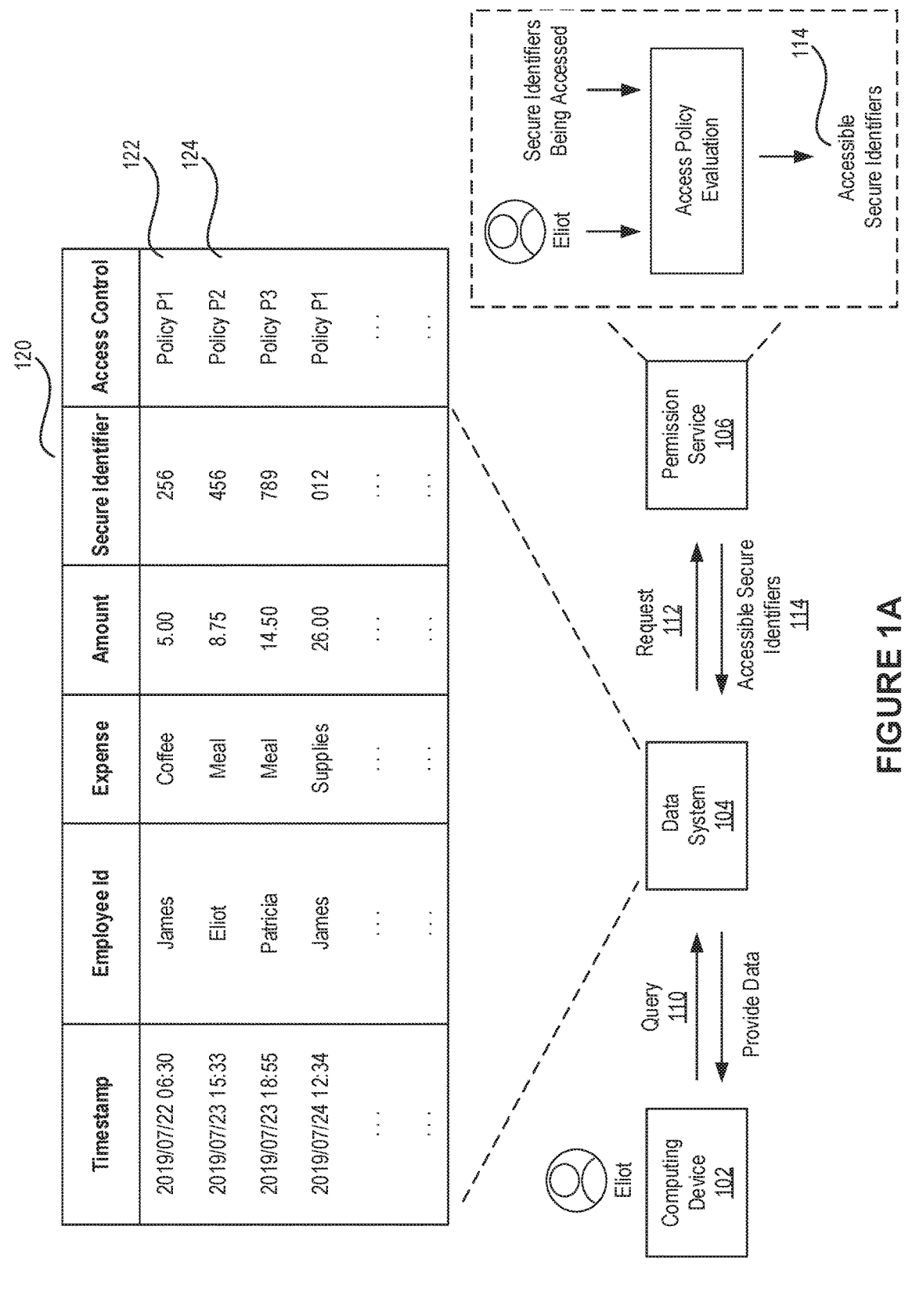
FIGS. 1A-1B illustrate example diagrams, in accordance with various embodiments.

For example, FIG. 1A illustrates an example environment 100 including a computing device 102, a data system 104, and a permission service 106. In this example, the computing device 102 is being operated by a user "Eliot" who is attempting to access data from an expenses database table 120. As illustrated, the table 120 has a "timestamp" column, an "employee id" column, an "expense" column, an "amount" column, a "secure identifier" column, and an "access control" column. In this example, the "timestamp" column indicates a timestamp of when an expense report was submitted by an employee, the "employee id" column names the employee that incurred the expense, the "expense" column indicates a type of expense incurred, the "amount" column indicates an amount of the expense, the "secure identifier" column provides a secure identifier for identifying a row, and the "access control" column identifies one or more access control policies to be satisfied by a user attempting to access a given row. In the example of FIG. 1A, while operating the computing device 102, the user Eliot may submit a query 110 to the data system 104 to determine an average expense amount from the expenses column in the table 120. Before running the query, the data system 104 needs to determine which rows of the table 120 are accessible to the user Eliot. That is, the data system 104 needs to determine which rows the user Eliot is authorized to access based on respective access control policies associated with the rows. In general, rows that are accessible to the user Eliot will be included in the average expense amount calculation while rows inaccessible to the user Eliot will be excluded from the average expense amount calculation. In the example of FIG. 1A, the data system 104 can send a request 112 to the permission service 106. The request 112 can identify secure identifiers associated with all of the rows in the table 120 from which the user Eliot is attempting to compute the average expense amount. The permission service 106 can evaluate access control policies associated with each row with respect to credentials associated with the user Eliot to determine whether the row is accessible to the user Eliot. For example, a row 122 in the table 120 can be associated with an access control policy P1 which permits access to a user James, an employee who incurred the expense, and the user Eliot, a supervisor that manages James. Similarly, a row 124 in the table 120 can be associated with an access control policy P2 which permits access to the user Eliot, an employee who incurred the expense, and any users associated with an executive employees group. In this example, credentials associated with the user Eliot who submitted the query 110 can be evaluated to determine that the user Eliot is permitted to access both rows 122 and 124. Once access control evaluations are complete, the permission service 106 can provide the data system 104 with a list of accessible secure identifiers 114 corresponding to rows that are determined to be accessible to the user Eliot. The data system 104 can then compute the average expense amount based on expenses corresponding to the rows that are determined to be accessible to the user Eliot. For example, the data system 104 can run a semi-join on the table 120 to filter out rows the user Eliot cannot access, and then compute the average expense amount. Such itemized evaluation of access control policies can become especially computationally burdensome when users submit queries involving many records that need to be individually evaluated based on separate access control policies. In some instances, such queries may be incapable of being executed when a table being queried includes millions of records that need to be individually evaluated. Further, access control policies, which can regulate access on a per-record (or per-row) level, are often defined globally and thus difficult to customize. Additionally, since records can each have their own access control policies, there is potential for an excessive number of policies to be created thereby requiring additional overhead for managing and processing such policies. These conventional approaches are thus associated with a number of limitations that prevent efficient implementation and evaluation of fine-grained access control policies.

A claimed solution rooted in computer technology overcomes problems specifically arising in the realm of computer technology. In various embodiments, user access to data can be evaluated based on archetype policies which define "shapes" of policies that can be evaluated with respect to one or more variables. For example, an archetype policy can be defined as a logical formula (e.g., one or more expressions) that can be evaluated based on one or more variables that correspond to a user state (e.g., user name, user identifier, job title, group membership, length of employment, etc.). In some embodiments, these variables can be mapped to values encoded in one or more columns of a dataset (or table) to which the archetype policy applies. For example, each record (or row) of the dataset can include values for these variables that can be evaluated based on the logical formula defined in the archetype policy to determine whether a given user has access to that record (e.g., read access, write access, modify access, or any combination thereof). In some embodiments, the logical formula defined in the archetype policy can output a filter that can be run on the dataset to return records (or rows) that are accessible to a given user. For example, the logical formula can return an SQL expression with one or more where clauses that leverage database technology to identify records that are accessible to a given user and at a speed much faster than would be possible under conventional approaches. Unlike conventional approaches, the claimed solution does not require creation of individual, record-specific policies to enable fine-grained user access to various records of datasets. Instead, archetype policies can be evaluated to determine user access to a given dataset and records of the dataset based on variable values that are included in the same records of the dataset. This improved approach also reduces the computational burden that would otherwise typically be imposed on a permission service that is tasked with determining user access to records based on myriad individual policies associated with those records.

Figure 1B:
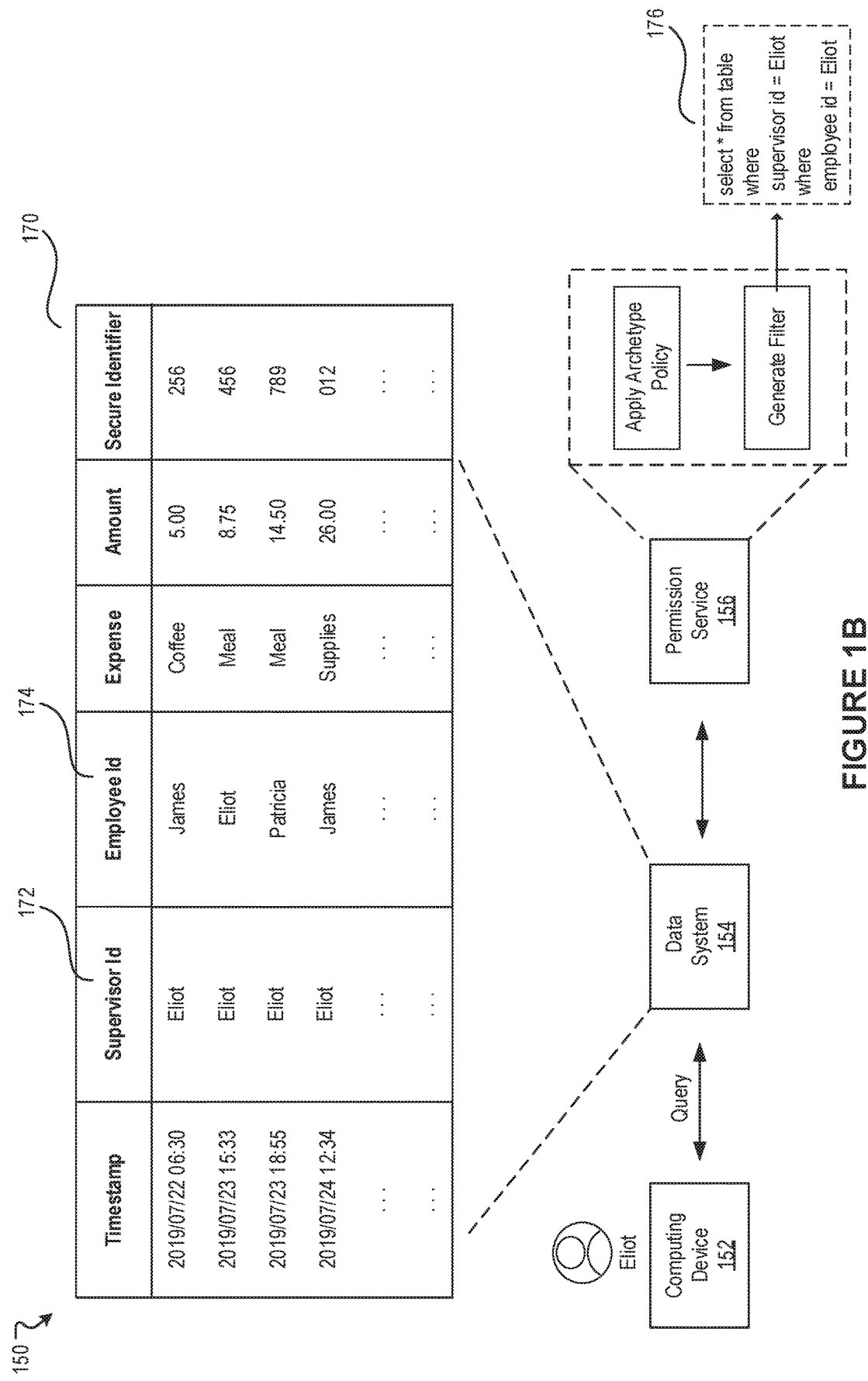

For example, FIG. 1B illustrates an example environment 150 including a computing device 152, a data system 154, and a permission service 156. In this example, the computing device 152 is being operated by a user Eliot who is attempting to determine an average expenses amount from an expenses database table 170. In this example, the table 170 is associated with an archetype policy that permits a user to access a given record (or row) of the table 170 provided the user is an employee that incurred an expense associated with the record or the user is a supervisor of an employee that incurred an expense associated with the record. Here, the archetype policy can include a logical formula that evaluates a first variable that is mapped to a "supervisor id" column 172 and a second variable that is mapped to an "employee id" column 174. When the user Eliot submits a query to determine an average expenses amount, the permission service 156 can apply the archetype policy based on information describing the user Eliot (e.g., credentials, such as user id, etc.) to generate a filter. The filter is provided as an example SQL expression 176 that can be run as a query against the table 170 to identify records that are accessible to the user Eliot. For example, the SQL expression 176 includes a first where clause to identify records for which the user Eliot is listed as a supervisor of an employee that incurred an expense and a second where clause to identify records for which the user Eliot is listed as an employee that incurred an expense. The data system 154 can apply the filter 176 to the table 170 to determine any records within the table 170 that are accessible to the user Eliot. The data system 154 can also determine an average expense amount to satisfy the query submitted by the user Eliot based on these accessible records. The archetype policy, therefore, can appropriately regulate user access to different records of the table 170 without having to individually define a separate policy for each record. Further, the generated filter 176 allows the data system 154 to readily identify records that are accessible to the user Eliot without requiring additional operations (e.g., joins) that are typically needed by conventional approaches. Moreover, in various embodiments, archetype policies can be updated atomically and multiple archetype policies can be modified simultaneously. That is, an archetype policy governing access to an arbitrary number of records can be modified at the same time. In another improvement, filters (e.g., SQL expressions, lists filtered by array types) generated by archetype policies can be reused to implement access control within other data systems (e.g., databases). More details describing the permission service 156 and features related to the disclosed technology are described in U.S. Pat. No. 9,888,039, issued Feb. 6, 2018, which is incorporated by reference herein.

Figure 2:
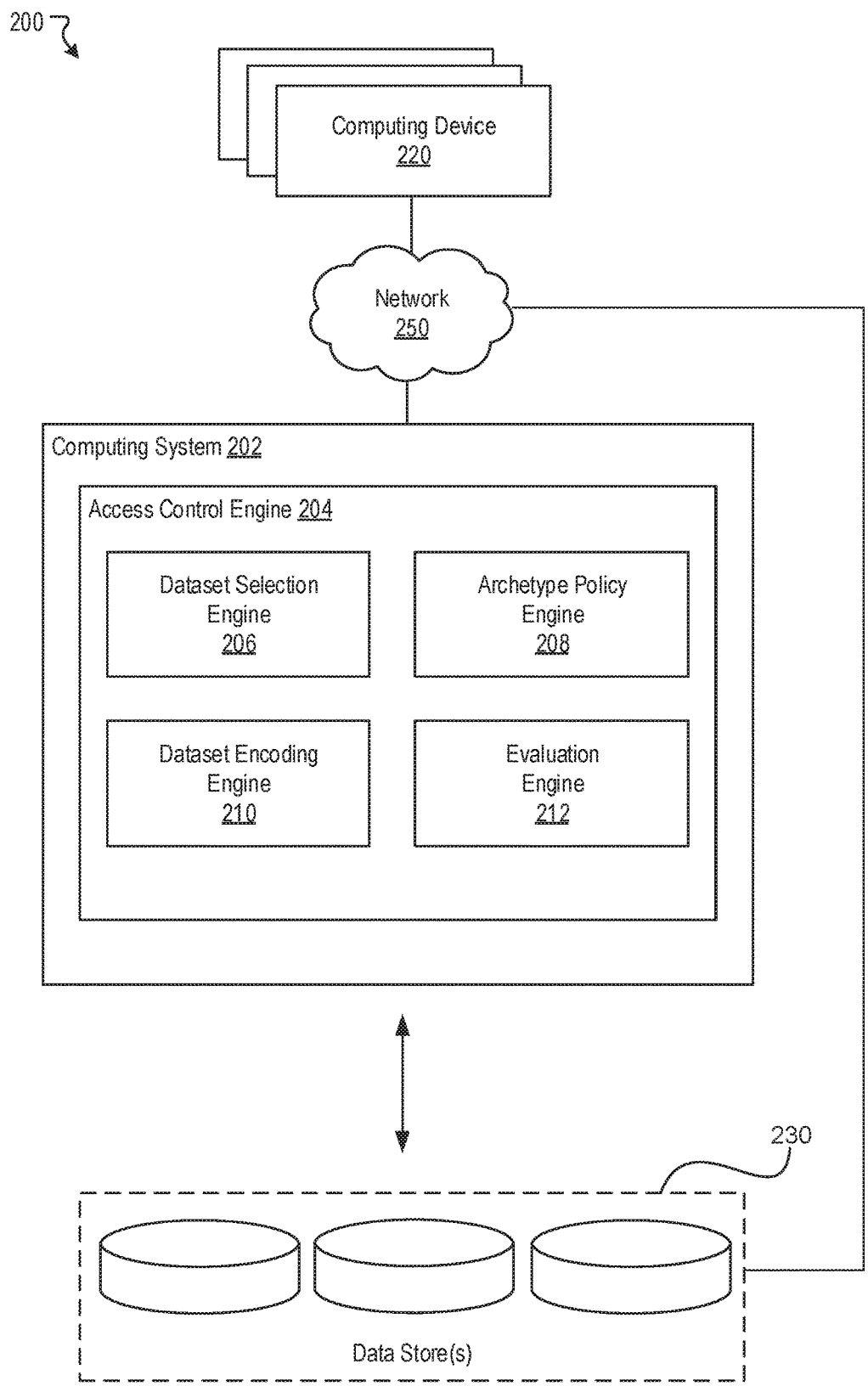
FIG. 2 illustrates an example computing environment, in accordance with various embodiments.

FIG. 2 illustrates an example environment 200, in accordance with various embodiments. The example environment 200 can include at least a computing system 202 and at least one computing device 220. The computing system 202 and the computing device 220 can each include one or more processors and memory. The processors can be configured to perform various operations by interpreting machine-readable instructions. The computing system 202 can access one or more data stores 230. In general, a data store may be any device in which data can be stored and from which data can be retrieved. In some embodiments, such data may be managed in an object graph which may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. The computing system 202, the computing device 220, and the data stores 230 may be accessible either directly or over a network 250. The network 250 may be any wired or wireless network through which data can be sent and received (e.g., the Internet, local area network, etc.). The computing system 202 can be configured to process requests received from the computing device 220. For example, the requests may be generated by a user operating the computing device 220 or from software applications running on the computing device 220. In various embodiments, such requests can be related to requests for various types of data to which access is restricted and enforced by an access control engine 204. For example, data may be restricted based on various archetype policies that regulate user access to datasets and individual records within datasets, for example. In various embodiments, the access control engine 204 can include a dataset selection engine 206, an archetype policy engine 208, a dataset encoding engine 210, and an evaluation engine 212. The access control engine 204 and its sub-engines can be executed by the processor(s) of the computing system 202 to perform various operations. In general, the access control engine 204 and its sub-engines can be implemented, in whole or in part, as software that is capable of running on one or more computing devices or systems. In one example, the access control engine 204 its sub-engines may be implemented as or within a software application running on one or more computing devices 220 (e.g., user or client devices) and/or one or more servers (e.g., cloud servers). Many variations are possible.

The dataset selection engine 206 can provide options for selecting a dataset to which an archetype policy will be applied for purposes of implementing access control measures. In general, the dataset may be any form of data, tabular or otherwise. For example, the dataset may be a database table 302, where every column represents a particular variable, and each row corresponds to a given record of the dataset, as illustrated in the example of FIG. 3A. In this example, the table 302 has a "timestamp" column, an "employee id" column, an "expense" column, an "amount" column, and a "secure identifier" column. In this example, the "timestamp" column indicates a timestamp of when an expense report was submitted by an employee, the "employee id" column identifies the employee that incurred the expense, the "expense" column indicates a type of expense incurred, the "amount" column indicates an amount of the expense, and the "secure identifier" column provides a secure identifier for identifying a row. The table 302 is provided merely as an example dataset and, naturally, variations are possible.

The archetype policy engine 208 can provide options for creating and deploying archetype policies for various datasets. In various embodiments, an archetype policy can define access control measures on a per-dataset and/or a per-record level. For example, a given archetype policy can define access control measures that restrict user access to records of a dataset. In some embodiments, the archetype policy can define one or more logical formulas (e.g., one or more expressions) that can be evaluated based on one or more variables. For example, a logical formula can define conditions that must be satisfied before a user is permitted access to data. A logical formula may also include one or more logical operators (e.g., OR, AND, NOT, etc.) for evaluating variables. Further, the variables to be evaluated may correspond to properties associated with a user state (e.g., user name, user identifier, job title, group membership, length of employment, etc.) of a user requesting access. Thus, logical formulas can be created based on any number of conditions and variables. For example, a logical formula can define conditions that grant or deny users access based on their identity. In some embodiments, a logical formula can define conditions that grant or deny users access based on a title or hierarchy. In some embodiments, a logical formula can define conditions that grant or deny users access based on their group memberships. In some embodiments, a logical formula can define conditions that grant or deny users access based on some time-based restriction. Many variations are possible. For example, an archetype policy can include logical formulas that can be evaluated to verify that a pair of users do not have overlapping access to some data (e.g., dataset, individual records, etc.) by evaluating the logical formulas for both users and then demonstrating the logical formulas are not satisfiable or define a condition for which the logical formulas could be satisfiable. For example, a data system may segregate users based on their country of residence. In this example, an archetype policy can be defined to prevent users based in the United States from accessing data residing in the United Kingdom and similarly prevent users based in the United Kingdom from accessing data residing in the United States. The archetype policy can include a user attribute condition User_Country which returns a user's country of residence upon evaluation. Thus, the condition can return User_Country="US" for users residing in the United States and User_Country="UK" for users residing in the United Kingdom. These two conditions can be intersected using an AND logical operator to determine 'User_Country=US AND User_Country=UK'=>'US=UK'=>no UK user has access to US data and vice versa. Again, many variations are possible.

Figure 3B:
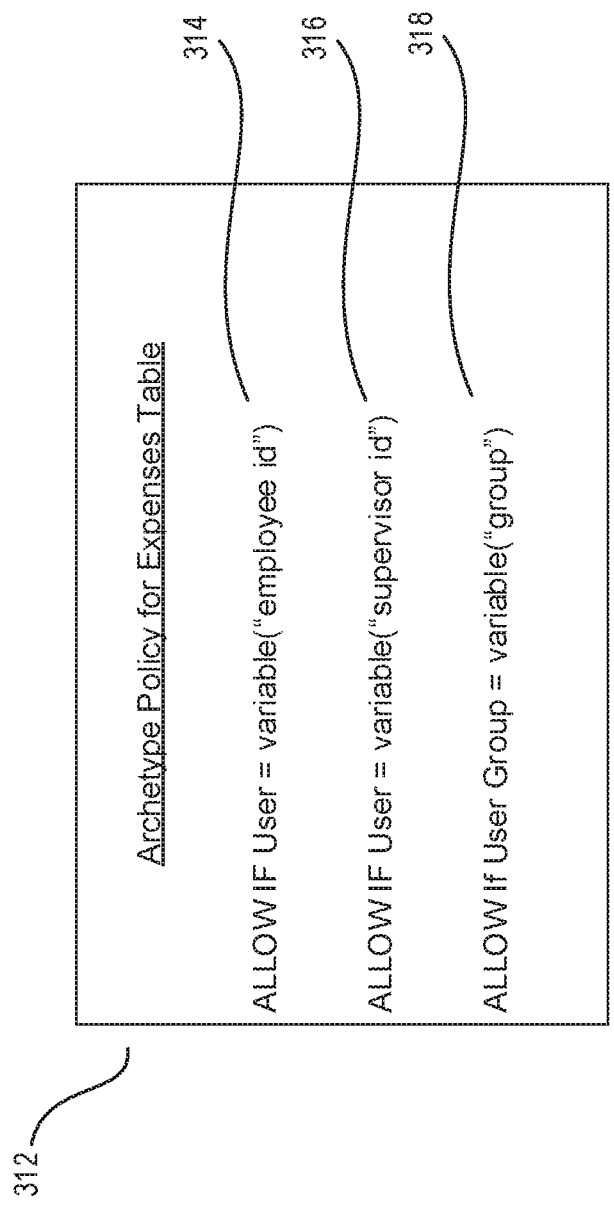
Figure 3C:
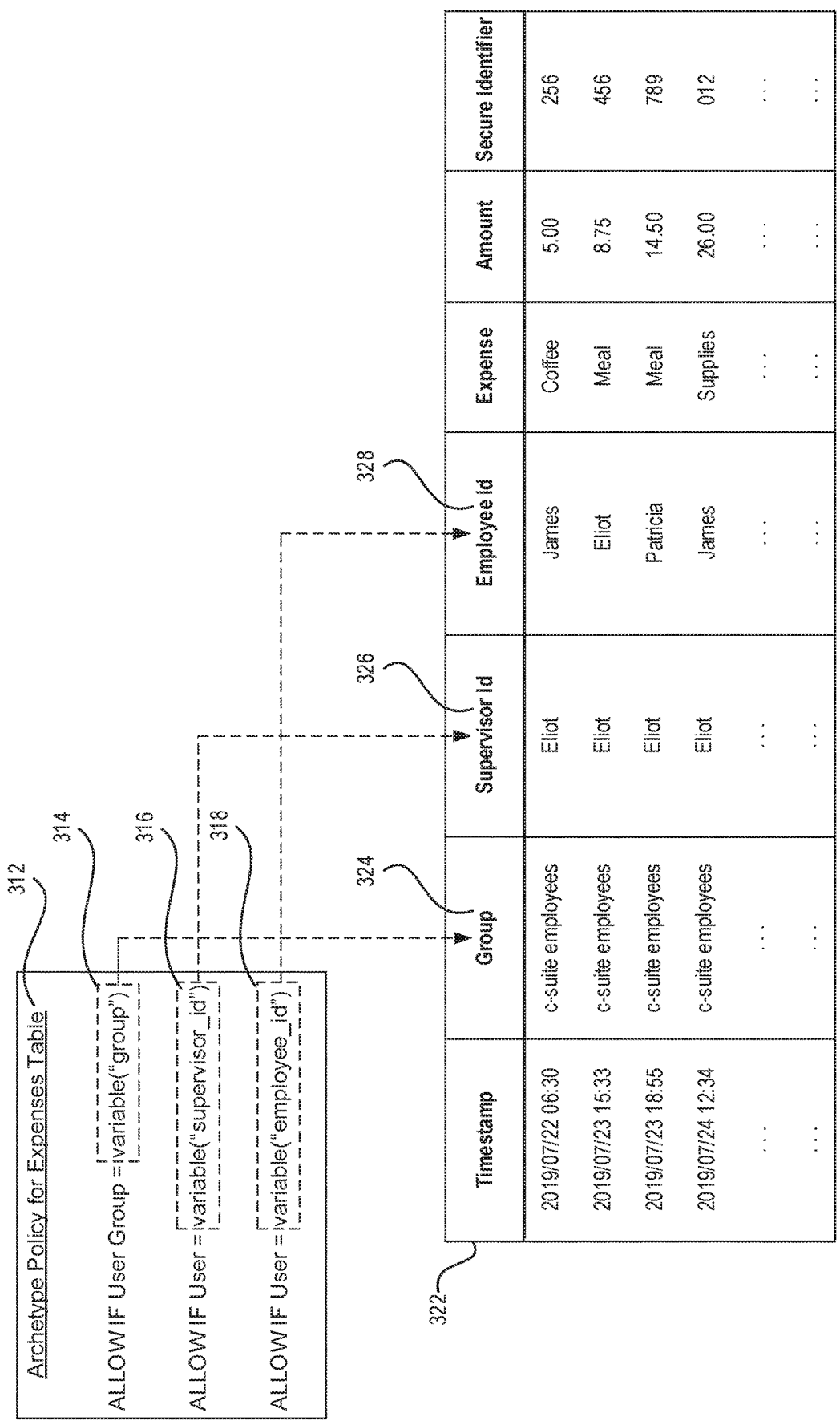

In various embodiments, variables used to evaluate logical formulas can be mapped to values encoded in one or more columns of a dataset for which access is governed by the archetype policy. For example, FIG. 3B illustrates an example archetype policy 312 that permits access to records of the expenses table 302 based on a number of conditions. For example, the archetype policy 312 includes a first logical formula 314 that permits a user to access a record provided a user id of the user matches a value corresponding to an "employee id" column associated with the record (e.g., the user is an employee that incurred an expense), a second logical formula 316 that permits a user to access a record provided a user id of the user matches a value corresponding to a "supervisor id" column associated with the record (e.g., the user is a supervisor of a user that incurred an expense), and a third logical formula 318 that permits a user to access the record provided a group associated with the user matches a value corresponding to a "group" column associated with the record (e.g., the user belongs to a particular group which has access to the record). As mentioned, variables can be mapped to values encoded in one or more columns of the expenses table 302 to which the archetype policy applies. For example, each record of the expenses table 302 can include values for these variables which can be evaluated based on the logical formulas defined in the archetype policy to determine whether a given user has access to that record (e.g., read access, write access, modify access, or any combination thereof). In some instances, a dataset may not include variables which are relied upon by a logical formula. In such instances, the archetype policy engine 208 can modify the dataset to encode the variables needed to evaluate logical formulas associated with an archetype policy that applies to the dataset, as described in reference to the data encoding module 210. For example, FIG. 3C illustrates a modified version 322 of the expenses table 302 which includes a new "group" column 324 and "supervisor id" column 326. In this example, a variable associated with the first logical formula 314 corresponding to "group" is mapped to the "group" column 324, a variable associated with the second logical formula 316 corresponding to "supervisor id" is mapped to the "supervisor id" column 326, and a variable associated with the third logical formula 318 corresponding to "employee id" is mapped to the "employee id" column 328 of the modified expenses table 322. The "group" column includes values indicating group memberships of users that are permitted to access a given record in the modified expenses table 322. The "supervisor id" column includes values identifying a supervisor of a user that incurred an expense. The "employee id" column includes values identifying a user that incurred an expense associated with a given record.

As mentioned, the dataset encoding engine 210 can be configured to modify datasets to include variables that are relied upon by logical formulas associated with archetype policies that apply to the datasets. For example, the dataset encoding engine 210 can modify a given dataset by creating new columns that correspond to variables relied upon by logical formulas. The dataset encoding engine 210 can also populate values for these new columns, for example, based on values specified by users or based on values that are defined in other datasets or data sources (e.g., a corporate organization chart, etc.).

Figure 3D:
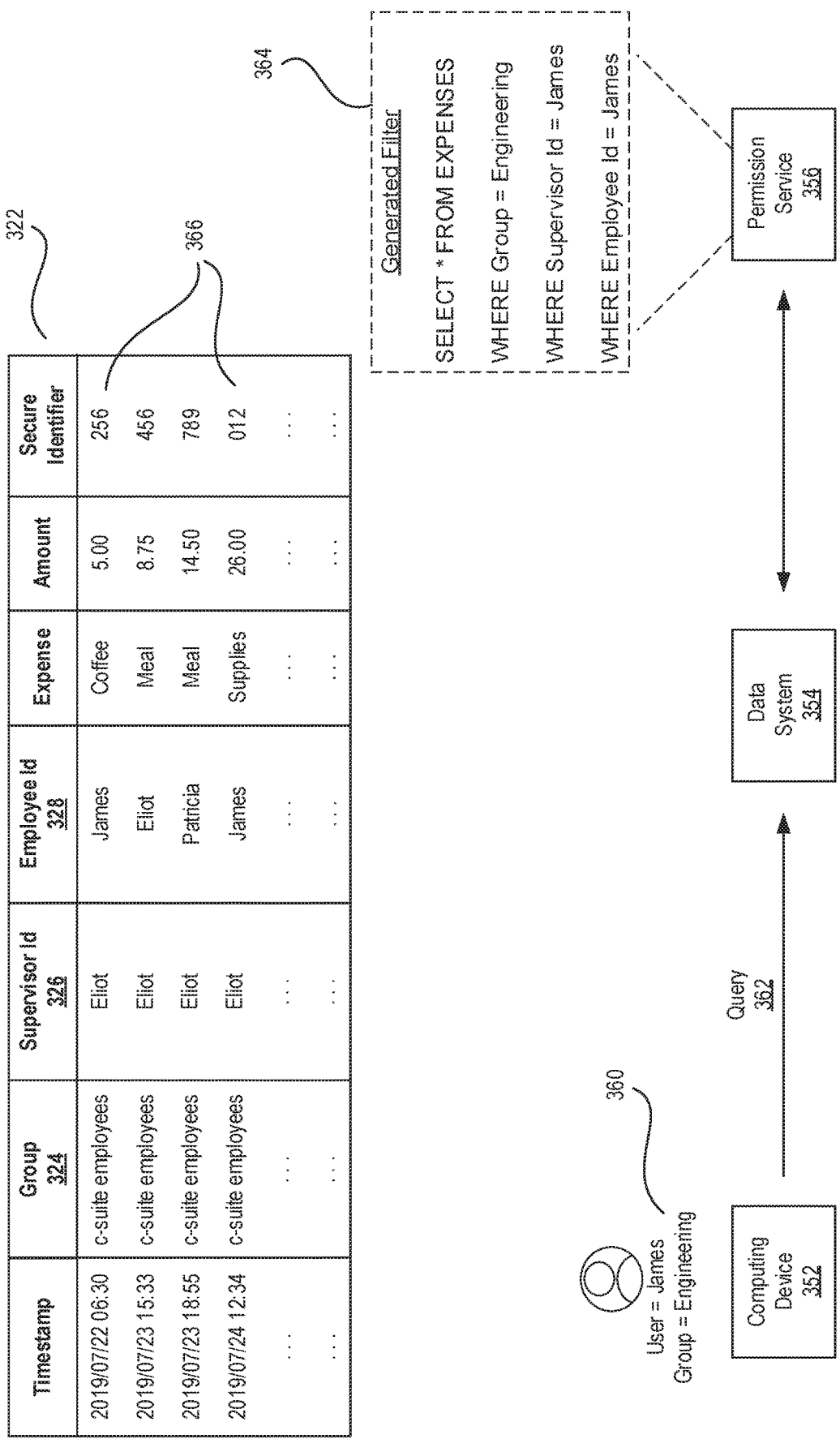

The evaluation engine 212 can determine whether a given user has access to a given dataset (or record) based on an evaluation of archetype policies associated with the dataset (or record) with respect to a state of the user. For example, FIG. 3D illustrates an example scenario of a user James requesting access to records of the modified expenses table 322. The modified expenses table 322 can be associated with the archetype policy 312 defined above in reference to FIG. 3B. In this example, the user James is associated with a user state 360 that identifies the user James and a group "engineering" with which the user James is associated. While operating the computing device 352, the user James can submit a query 362 to a data system 354. For example, the query 362 may request the data system 354 to compute a histogram of expense types (e.g., coffee, meal, supplies, etc.) from the modified expenses table 322. Before computing the histogram, the data system 354 can interact with a permission service 356 to determine records that are accessible to the user James based on the archetype policy 312. The permission service 356 can implement the evaluation engine 212. In this example, the evaluation engine 212 can determine the user James has access to a given record based on the first logical formula 314 in the archetype policy 312, which is satisfied if an identifier corresponding to the user James matches a value of the record in the "employee id" column 328. Further, the evaluation engine 212 can determine the user James has access to a given record based on the second logical formula 316 in the archetype policy 312, which is satisfied if an identifier corresponding to the user James matches a value of the record in the "supervisor id" column 326. Further still, the evaluation engine 212 can determine the user James has access to a given record based on the third logical formula 318 in the archetype policy 312, which is satisfied if a group identifier corresponding to the user James matches a value of the record in the "group" column 324. In this example, the evaluation engine 212 can determine the user James has access to records 366 since the user James satisfies the first logical formula 314. In some embodiments, the evaluation engine 212 can output a filter that can be applied to the modified expenses table 322 by the data system 354 to return records that are accessible to the user James. For example, the evaluation engine 212 can return an SQL expression 364 with a first where clause that identifies records that have "engineering" as a "group" column 324 value, a second where clause that identifies records that have the user James listed in the "supervisor id" column 326, and a third where clause that identifies records that have the user James listed in the "employee id" 328 column. Many variations are possible.

Figure 4:
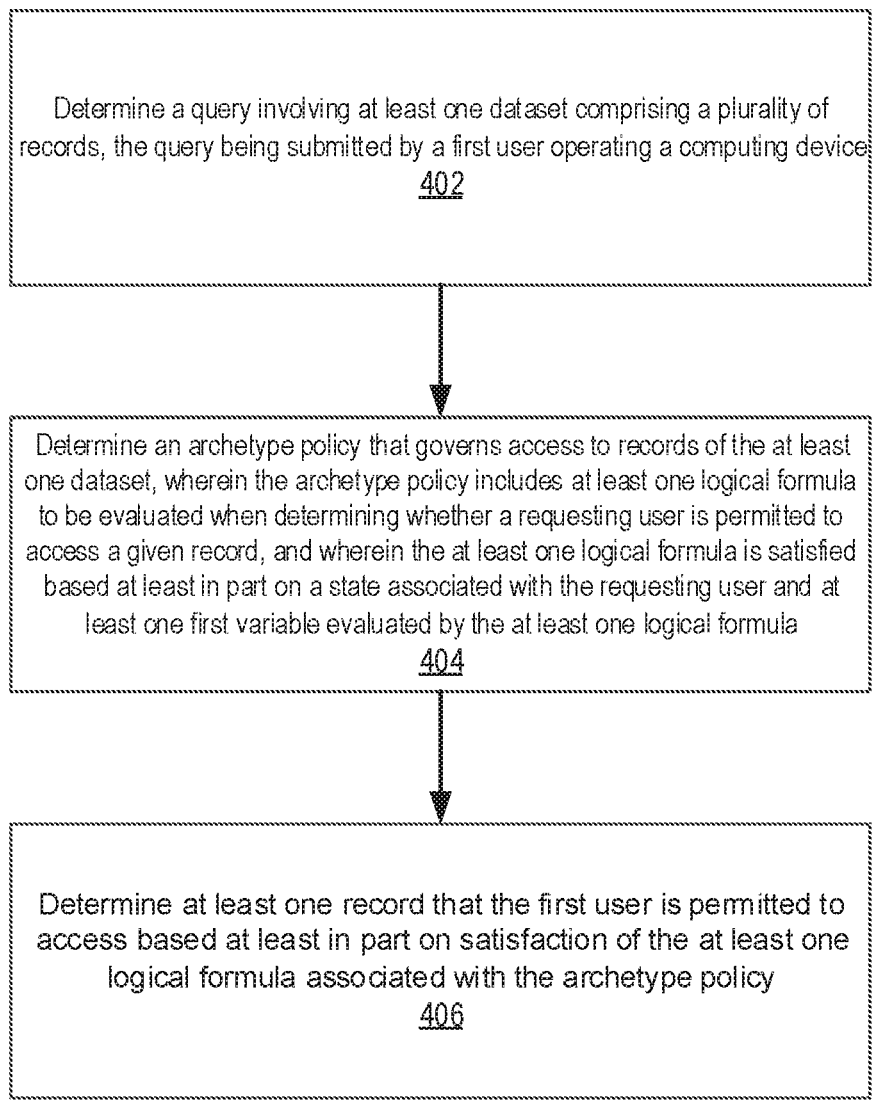
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 200 of FIG. 2. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a query involving at least one dataset comprising a plurality of records can be determined. The query can be submitted by a first user operating a computing device. At block 404, an archetype policy that governs access to records of the at least one dataset can be determined. The archetype policy can include at least one logical formula to be evaluated when determining whether a requesting user is permitted to access a given record. The at least one logical formula can be satisfied based at least in part on a state associated with the requesting user and at least one first variable evaluated by the at least one logical formula. At block 406, at least one record that the first user is permitted to access can be determined based at least in part on satisfaction of the at least one logical formula associated with the archetype policy.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
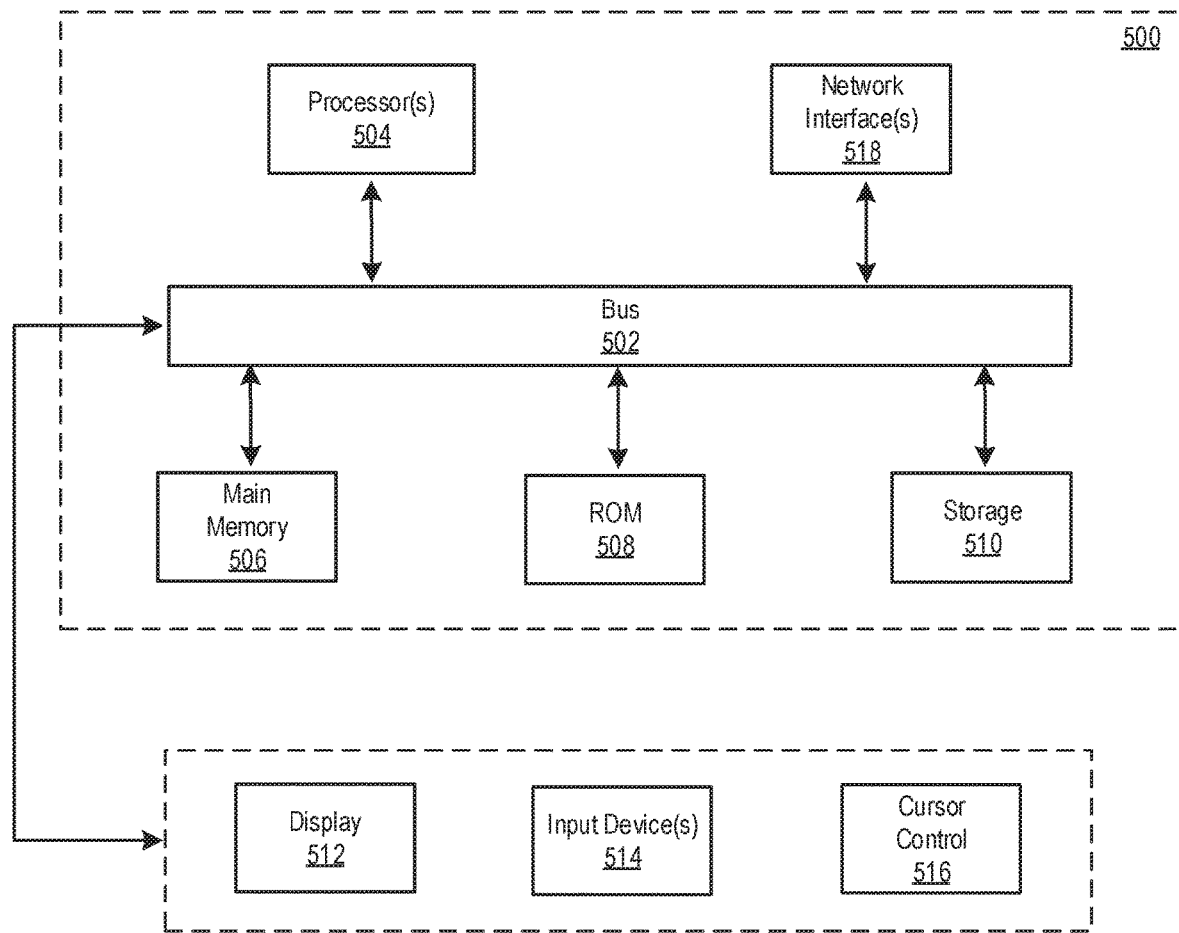
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module (or engine) to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules (or engines) may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
determining a query involving at least one dataset comprising a plurality of records, the query being submitted by an entity operating a computing device;
determining an archetype policy that governs access to records of the at least one dataset, wherein the archetype policy includes a logical formula to be evaluated when determining whether the entity is permitted to access a given record;
evaluating the archetype policy, wherein the evaluating of the archetype policy comprises evaluating the logical formula based on values or attributes of a variable that are inferred from a different dataset or a different data source besides the at least one dataset, wherein the values or attributes of the variable are missing from the at least one dataset and correspond to a characteristic of the entity;
creating new entries corresponding to the respective records in the at least one dataset, wherein at least a portion of the new entries comprise or encode the inferred values or attributes of the variable; and
determining at least one record that the entity is permitted to access based at least in part on satisfaction of the logical formula associated with the archetype policy.

2. The system of claim 1, wherein the characteristic of the entity identifies one or more properties associated with the entity including at least one of: a user name, a user identifier, and one or more groups associated with the entity.

3. The system of claim 1, wherein determining at least one record that the entity is permitted to access further causes the system to perform:
determining the characteristic of the entity matches a value of the values or attributes of the variable.

4. The system of claim 1, wherein the characteristic comprises a user identifier associated with the entity.

5. The system of claim 1, wherein the characteristic comprises
a group name associated with the entity.

6. The system of claim 1, wherein the instructions further cause the system to perform:
modifying the archetype policy to include a second logical formula that relies on a second variable.

7. The system of claim 1, wherein determining at least one record that the entity is permitted to access based at least in part on satisfaction of the logical formula associated with the archetype policy further causes the system to perform:
generating a filter for identifying records of the at least one dataset that satisfy the logical formula, wherein the records identified are deemed accessible to the entity.

8. The system of claim 7, wherein the filter is an Structured Query Language (SQL) expression including one or more where clauses to identify records that are accessible to the entity.

9. The system of claim 1, wherein the entity comprises a first entity; and the logical formula is further based on a corresponding attribute of a second entity.

10. A computer-implemented method, comprising:
determining a query involving at least one dataset comprising a plurality of records, the query being submitted by an entity operating a computing device;
determining an archetype policy that governs access to records of the at least one dataset, wherein the archetype policy includes a logical formula to be evaluated when determining whether the entity is permitted to access a given record;
evaluating the archetype policy, wherein the evaluating of the archetype policy comprises evaluating the logical formula based on values or attributes of a variable that are inferred from a different dataset or a different data source besides the at least one dataset, wherein the values or attributes of the variable are missing from the at least one dataset and correspond to a characteristic of the entity;
creating new entries corresponding to the respective records in the at least one dataset, wherein at least a portion of the new entries comprise or encode the inferred values or attributes of the variable; and
determining at least one record that the entity is permitted to access based at least in part on satisfaction of the logical formula associated with the archetype policy.

11. The computer-implemented method of claim 10, wherein the characteristic of the entity identifies one or more properties associated with the entity including at least one of: a user name, a user identifier, and one or more groups associated with the entity.

12. The computer-implemented method of claim 10, wherein determining at least one record that the entity is permitted to access further causes the system to perform:
determining the characteristic of the entity matches a value of the values or attributes of the variable.

13. The computer-implemented method of claim 10, wherein the characteristic comprises a user identifier associated with the entity.

14. A non-transitory computer readable medium comprising instructions that, when executed, cause one or more processors of a computing system to perform:
determining a query involving at least one dataset comprising a plurality of records, the query being submitted by an entity operating a computing device;
determining an archetype policy that governs access to records of the at least one dataset, wherein the archetype policy includes a logical formula to be evaluated when determining whether the entity is permitted to access a given record;
evaluating the archetype policy, wherein the evaluating of the archetype policy comprises evaluating the logical formula based on values or attributes of a variable that are inferred from a different dataset or a different data source besides the at least one dataset, wherein the values or attributes of the variable are missing from the at least one dataset and correspond to a characteristic of the entity;
creating new entries corresponding to the respective records in the at least one dataset, wherein at least a portion of the new entries comprise or encode the inferred values or attributes of the variable; and
determining at least one record that the entity is permitted to access based at least in part on satisfaction of the logical formula associated with the archetype policy.

15. The non-transitory computer readable medium of claim 14, wherein the characteristic of the entity identifies one or more properties associated with the entity including at least one of: a user name, a user identifier, and one or more groups associated with the entity.

16. The non-transitory computer readable medium of claim 14, wherein determining at least one record that the entity is permitted to access further causes the computing system to perform:
   determining the characteristic of the entity matches a value of the values or attributes of the variable.

17. The non-transitory computer readable medium of claim 14, wherein the characteristic comprises a user identifier associated with the entity.

* * * * *